(12) United States Patent
Zuev

(10) Patent No.: US 9,069,750 B2
(45) Date of Patent: Jun. 30, 2015

(54) METHOD AND SYSTEM FOR SEMANTIC SEARCHING OF NATURAL LANGUAGE TEXTS

(75) Inventor: Konstantin Zuev, Moscow (RU)

(73) Assignee: ABBYY InfoPoisk LLC (RU)

(\*) Notice: Subject to any disclaimer, the term of this patent is extended or adjusted under 35 U.S.C. 154(b) by 507 days.

(21) Appl. No.: 13/173,649

(22) Filed: Jun. 30, 2011

(65) Prior Publication Data

US 2011/0270607 A1    Nov. 3, 2011

Related U.S. Application Data

(63) Continuation-in-part of application No. 12/983,220, filed on Dec. 31, 2010, which is a continuation-in-part of application No. 11/548,214, filed on Oct. 10, 2006, now Pat. No. 8,078,450.

(51) Int. Cl.
   *G06F 17/27* (2006.01)
   *G06F 17/30* (2006.01)

(52) U.S. Cl.
   CPC ............ *G06F 17/27* (2013.01); *G06F 17/2785* (2013.01); *G06F 17/30684* (2013.01)

(58) Field of Classification Search
   CPC .................................................. G06F 17/2785
   USPC ......... 704/9–10; 707/705, 708, 711, 713, 736
   See application file for complete search history.

(56) References Cited

U.S. PATENT DOCUMENTS 5,268,839 A    12/1993   Kaji
5,301,109 A *  4/1994    Landauer et al. ................. 704/9

(Continued)

FOREIGN PATENT DOCUMENTS

EP       2400400 A1    12/2001
WO    2011160204 A1    12/2011

OTHER PUBLICATIONS

Bolshakov,I.A. "Co-Ordinative Ellipsis in Russian Texts: Problems of Description and Restoration", Proceedings of the 12th conference on Computational linguistics, vol. 1, pp. 65-67, Association of Computational Linguistics, Moscow, USSR, 1988.

(Continued)

*Primary Examiner* — Shaun Roberts
(74) *Attorney, Agent, or Firm* — LeighAnn Weiland; Veronica Weinstein

(57) ABSTRACT

A method and system comprising an automated analysis of at least one corpus of natural language text is disclosed. For each sentence of a corpus, the analysis includes performing a syntactic analysis using linguistic descriptions to generate at least one syntactic structure for the sentence, building a semantic structure for the sentence, associating each generated syntactic and semantic structure with the sentence, and saving each generated syntactic and semantic structure. For each corpus text that was preliminary analyzed, performing an indexing operation to index lexical meanings and values of linguistic parameters of each syntactic structure and each semantic structure associated with sentences in the corpus text. A semantic search as disclosed herein includes at least one automatic preliminary analyzed corpus of sentences comprising searched values of linguistic, syntactic and semantic parameters. Due to deep semantic analysis of one or more corpora, the search may be executed in various languages, in resources of various languages, and in text corpora of various languages, regardless of the language of the query.

28 Claims, 15 Drawing Sheets

(56) References Cited

U.S. PATENT DOCUMENTS

| | | | |
|---|---|---|---|
| 5,386,556 A | 1/1995 | Hedin et al. | |
| 5,418,717 A | 5/1995 | Su et al. | |
| 5,687,383 A | 11/1997 | Nakayama et al. | |
| 5,715,468 A * | 2/1998 | Budzinski | 704/9 |
| 5,752,051 A * | 5/1998 | Cohen | 704/1 |
| 5,787,410 A * | 7/1998 | McMahon | 707/760 |
| 6,006,221 A * | 12/1999 | Liddy et al. | 1/1 |
| 6,055,528 A * | 4/2000 | Evans | 1/1 |
| 6,076,051 A * | 6/2000 | Messerly et al. | 704/9 |
| 6,081,774 A * | 6/2000 | de Hita et al. | 704/9 |
| 6,182,028 B1 | 1/2001 | Karaali et al. | |
| 6,243,670 B1 | 6/2001 | Bessho et al. | |
| 6,246,977 B1 | 6/2001 | Messerly et al. | |
| 6,381,598 B1 * | 4/2002 | Williamowski et al. | 704/1 |
| 6,442,524 B1 | 8/2002 | Ecker et al. | |
| 6,601,026 B2 * | 7/2003 | Appelt et al. | 704/9 |
| 6,604,101 B1 * | 8/2003 | Chan et al. | 707/706 |
| 7,146,358 B1 * | 12/2006 | Gravano et al. | 1/1 |
| 7,200,550 B2 | 4/2007 | Menezes et al. | |
| 7,231,393 B1 | 6/2007 | Harik et al. | |
| 7,249,121 B1 | 7/2007 | Bharat et al. | |
| 7,263,488 B2 | 8/2007 | Chu et al. | |
| 7,272,595 B2 | 9/2007 | Tsuchitani et al. | |
| 7,383,258 B2 | 6/2008 | Harik et al. | |
| 7,406,542 B2 | 7/2008 | Erlingsson | |
| 7,426,507 B1 | 9/2008 | Patterson | |
| 7,490,099 B2 | 2/2009 | Myers et al. | |
| 7,536,408 B2 | 5/2009 | Patterson | |
| 7,555,428 B1 | 6/2009 | Franz et al. | |
| 7,580,827 B1 | 8/2009 | Brants et al. | |
| 7,580,921 B2 | 8/2009 | Patterson | |
| 7,580,929 B2 | 8/2009 | Patterson | |
| 7,584,175 B2 | 9/2009 | Patterson | |
| 7,599,914 B2 | 10/2009 | Patterson | |
| 7,672,831 B2 | 3/2010 | Todhunter et al. | |
| 7,689,536 B1 | 3/2010 | Weissman et al. | |
| 7,693,813 B1 | 4/2010 | Cao et al. | |
| 7,698,259 B2 | 4/2010 | Xue | |
| 7,698,266 B1 | 4/2010 | Weissman et al. | |
| 7,711,679 B2 | 5/2010 | Patterson | |
| 7,716,216 B1 | 5/2010 | Harik et al. | |
| 7,792,783 B2 | 9/2010 | Friedlander et al. | |
| 7,792,836 B2 | 9/2010 | Taswell | |
| 7,831,531 B1 | 11/2010 | Baluja et al. | |
| 7,840,589 B1 | 11/2010 | Holt et al. | |
| 7,877,371 B1 | 1/2011 | Lerner et al. | |
| 7,895,221 B2 | 2/2011 | Colledge et al. | |
| 7,912,705 B2 | 3/2011 | Wasson et al. | |
| 7,913,163 B1 | 3/2011 | Zunger | |
| 7,925,610 B2 | 4/2011 | Elbaz et al. | |
| 7,925,655 B1 | 4/2011 | Power et al. | |
| 7,937,265 B1 | 5/2011 | Pasca et al. | |
| 7,937,396 B1 | 5/2011 | Pasca et al. | |
| 7,987,176 B2 | 7/2011 | Latzina et al. | |
| 8,010,539 B2 | 8/2011 | Blair-Goldensohn et al. | |
| 8,019,748 B1 | 9/2011 | Wu et al. | |
| 8,024,372 B2 | 9/2011 | Harik et al. | |
| 8,051,104 B2 | 11/2011 | Weissman et al. | |
| 8,055,669 B1 | 11/2011 | Singhal et al. | |
| 8,065,248 B1 | 11/2011 | Baluja et al. | |
| 8,065,316 B1 | 11/2011 | Baker et al. | |
| 8,078,450 B2 | 12/2011 | Anisimovich et al. | |
| 8,086,594 B1 | 12/2011 | Cao et al. | |
| 8,086,619 B2 | 12/2011 | Haahr et al. | |
| 8,086,624 B1 | 12/2011 | Hubinette | |
| 8,090,723 B2 | 1/2012 | Cao et al. | |
| 8,108,412 B2 | 1/2012 | Patterson | |
| 8,112,437 B1 | 2/2012 | Katragadda et al. | |
| 8,117,223 B2 | 2/2012 | Patterson | |
| 8,122,026 B1 | 2/2012 | Laroco, Jr. et al. | |
| 8,145,473 B2 | 3/2012 | Anisimovich et al. | |
| 8,166,021 B1 | 4/2012 | Cao et al. | |
| 8,214,199 B2 | 7/2012 | Anismovich et al. | |
| 8,229,730 B2 | 7/2012 | Van Den Berg et al. | |
| 8,229,944 B2 | 7/2012 | Latzina et al. | |
| 8,271,453 B1 | 9/2012 | Pasca et al. | |
| 8,285,728 B1 | 10/2012 | Rubin | |
| 8,301,633 B2 | 10/2012 | Cheslow | |
| 8,402,036 B2 | 3/2013 | Blair-Goldensohn et al. | |
| 8,577,907 B1 | 11/2013 | Singhal et al. | |
| 2004/0098250 A1 | 5/2004 | Kimchi et al. | |
| 2005/0065916 A1 | 3/2005 | Ge et al. | |
| 2005/0240392 A1 * | 10/2005 | Munro et al. | 704/8 |
| 2005/0267871 A1 | 12/2005 | Marchisio et al. | |
| 2006/0106767 A1 | 5/2006 | Adcock et al. | |
| 2006/0106793 A1 | 5/2006 | Liang | |
| 2006/0149739 A1 | 7/2006 | Myers | |
| 2006/0184516 A1 | 8/2006 | Ellis | |
| 2007/0083505 A1 | 4/2007 | Ferrari et al. | |
| 2007/0130112 A1 | 6/2007 | Lin | |
| 2007/0156669 A1 | 7/2007 | Marchisio et al. | |
| 2007/0185860 A1 | 8/2007 | Lissack | |
| 2008/0133483 A1 | 6/2008 | Bayley et al. | |
| 2008/0133505 A1 | 6/2008 | Bayley et al. | |
| 2008/0243777 A1 | 10/2008 | Stewart et al. | |
| 2008/0294622 A1 | 11/2008 | Kanigsberg et al. | |
| 2008/0319947 A1 | 12/2008 | Latzina et al. | |
| 2009/0049040 A1 | 2/2009 | Fay et al. | |
| 2009/0063472 A1 | 3/2009 | Pell et al. | |
| 2009/0076839 A1 | 3/2009 | Abraham-Fuchs et al. | |
| 2009/0089047 A1 | 4/2009 | Pell et al. | |
| 2009/0089277 A1 | 4/2009 | Cheslow | |
| 2009/0112841 A1 | 4/2009 | Devarakonda et al. | |
| 2009/0182738 A1 | 7/2009 | Marchisio et al. | |
| 2009/0222441 A1 | 9/2009 | Broder et al. | |
| 2009/0271179 A1 | 10/2009 | Marchisio et al. | |
| 2010/0095196 A1 | 4/2010 | Grabarnik et al. | |
| 2010/0169314 A1 | 7/2010 | Green et al. | |
| 2010/0169337 A1 | 7/2010 | Green et al. | |
| 2010/0318423 A1 | 12/2010 | Kanigsberg et al. | |
| 2010/0332493 A1 | 12/2010 | Haas et al. | |
| 2011/0040772 A1 | 2/2011 | Sheu | |
| 2011/0055188 A1 | 3/2011 | Gras | |
| 2011/0072021 A1 | 3/2011 | Lu et al. | |
| 2011/0119254 A1 | 5/2011 | Brown et al. | |
| 2011/0153539 A1 | 6/2011 | Rojahn | |
| 2011/0202526 A1 | 8/2011 | Lee et al. | |
| 2011/0202563 A1 | 8/2011 | Colledge et al. | |
| 2011/0301941 A1 | 12/2011 | De Vocht | |
| 2011/0314032 A1 | 12/2011 | Bennett et al. | |
| 2012/0023104 A1 | 1/2012 | Johnson et al. | |
| 2012/0030226 A1 | 2/2012 | Holt et al. | |
| 2012/0047145 A1 | 2/2012 | Heidasch | |
| 2012/0131060 A1 | 5/2012 | Heidasch et al. | |
| 2012/0197885 A1 | 8/2012 | Patterson | |
| 2012/0203777 A1 | 8/2012 | Laroco, Jr. et al. | |
| 2012/0221553 A1 | 8/2012 | Wittmer et al. | |
| 2012/0246153 A1 | 9/2012 | Pehle | |
| 2012/0296897 A1 | 11/2012 | Xin-Jing et al. | |
| 2013/0013291 A1 | 1/2013 | Bullock et al. | |
| 2013/0054589 A1 | 2/2013 | Cheslow | |
| 2013/0091113 A1 | 4/2013 | Gras | |
| 2013/0254209 A1 | 9/2013 | Kang et al. | |

OTHER PUBLICATIONS

Hutchins, Mashine Translation: Past, Present, Future, Ellis Horwood, Ltd., Chichester, UK, 1986.

Mitamura, "An Efficient Interlingua Translation System for Multi-Lingual Document Production", Proceedings of Machine Translation Summit III, Washington DC, Jul. 2-4, 1991.

* cited by examiner

METHOD AND SYSTEM FOR SEMANTIC SEARCHING OF NATURAL LANGUAGE TEXTS

CROSS-REFERENCE TO RELATED APPLICATIONS

For purposes of the USPTO extra-statutory requirements, the present application constitutes a continuation-in-part of U.S. patent application Ser. No. 12/983,220, filed on 31 Dec. 2010, which is a continuation-in-part of U.S. Ser. No. 11/548,214, filed on 10 Oct. 2006, now U.S. Pat. No. 8,078,450, which is currently co-pending, or is an application of which a currently co-pending application is entitled to the benefit of the filing date.

The United States Patent Office (USPTO) has published a notice effectively stating that the USPTO's computer programs require that patent applicants reference both a serial number and indicate whether an application is a continuation or continuation-in-part. Stephen G. Kunin, Benefit of Prior-Filed Application, USPTO Official Gazette 18 Mar. 2003. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant is designating the present application as a continuation-in-part of its parent applications as set forth above, but expressly points out that such designations are not to be construed in any way as any type of commentary and/or admission as to whether or not the present application contains any new matter in addition to the matter of its parent application(s).

All subject matter of the Related Applications and of any and all parent, grandparent, great-grandparent, etc. applications of the Related Applications is incorporated herein by reference to the extent such subject matter is not inconsistent herewith.

BACKGROUND OF THE INVENTION

1. Field

Implementations of the present invention relate to search technology. In particular, implementations of the present invention relate to searching of electronic content available, for example, on the Internet and in other electronic resources, such as text corpora ("corpuses"), dictionaries, glossaries, encyclopedias, etc.

2. Related Art

The inventors are aware of search technology that generates search results based on keywords entered by a user as part of a search query.

However, due to homonymy and homography in natural languages, a search result based on a keyword search may include a substantial amount of non-relevant or marginally relevant information. For example, if the user searches for texts with the word "page" in the sense of "a man or boy employed as the personal attendant to a queen," the user may receive a large number of non-relevant information where "page" refers to an Internet page, a page of a newspaper or magazine, a section of stored data, etc. This is likely to happen because those other senses of the word "page" are substantially more frequent than the one referring to a man or boy.

Existing search systems make it possible to use simple query languages to find documents that either contain or do not contain the words or word combinations specified by the user. However, the user cannot specify whether the search words should occur within one sentence or not. Also, the user cannot formulate a query for a set of words that belong to a certain class. And finally, existing search systems do not allow users to find sentences based on their syntactic or semantic properties, e.g., examples illustrating a certain syntactic relationship, examples illustrating a semantic relationship, they do not allow to make queries based on grammatical meanings, deep or surface slots, syntactic models, style and/or semantic features, etc. These types of searches may be of use to lexicographers, philologists, linguists, and students and teachers of native or foreign languages, and many other users.

SUMMARY

According to a first aspect of the invention, there is provided a computer-implemented method, comprising:

preliminarily automatic analyzing at least one corpus of natural language texts comprising for each sentence of each natural language text of the corpus, the preliminarily analyzing including:

performing a syntactic analysis using linguistic descriptions to generate at least one syntactic structure for the sentence;

building a semantic structure for the sentence;

associating each generated syntactic and semantic structure with the sentence; and saving each generated syntactic and semantic structure;

for each corpus of natural language text that was preliminarily analyzed, performing an indexing operation to index lexical meanings and values of linguistic parameters of each syntactic structure and each semantic structure associated with sentences in the corpus; and searching in at least one preliminarily analyzed corpus for sentences comprising a searched value for at least one linguistic parameter.

According to a second aspect of the invention, there is provided a system for implementing the aforesaid method.

Other aspects of the invention will be apparent from the detailed description below. Generally, the present invention employs a full-fledged automatic syntactic and semantic analysis when indexing texts making it possible to index and store all syntactic and semantic information about each sentence, as well as all interim parsing and results and lexical choices, including results obtained when resolving ambiguities.

An analyzer uses various linguistic descriptions of a given natural language to reflect all the real complexities of the natural language, rather than simplified or artificial descriptions, without the danger of a combinatorial explosion. A principle of integral and purpose-driven recognition, (i.e. hypotheses about the structure of the part of a sentence are verified within the hypotheses about the structure of the whole sentence), is implemented as during the analysis stage. It allows to avoid analyzing numerous parsing of anomalous variants.

The use of the technology described herein allows one to search and find relevant information using a semantic query that can be expressed in specific semantic query language, or in a natural language. The same analyzer is able to analyze a question to recognize its syntactical structure, to build its semantic structure, and in such a way "to understand" the meaning of a query. Searching is implemented in accordance with syntax and semantic information included in or derived from searchable resources. A user receives only relevant search results.

Additionally, since the search query may be expressed or translated into semantic language-independent terms, the search may be executed in and derived from various languages, in resources of various languages, in text corpora of various languages. So, a user can get information that is presented in all resources regardless of the language of the query. The result of searching may be presented to users in a resource language (as it is presented in the resource), and also the result of searching may be translated into the language of the query by means of a machine translation system.

BRIEF DESCRIPTION OF THE DRAWINGS

FIG. 12 shows another example of query using semantic relations and semantic classes or lexical meanings that belong to a certain semantic class.

FIG. 13 shows still another example of query using semantic relations and semantic classes or lexical meanings.

DETAILED DESCRIPTION

Figure 1:
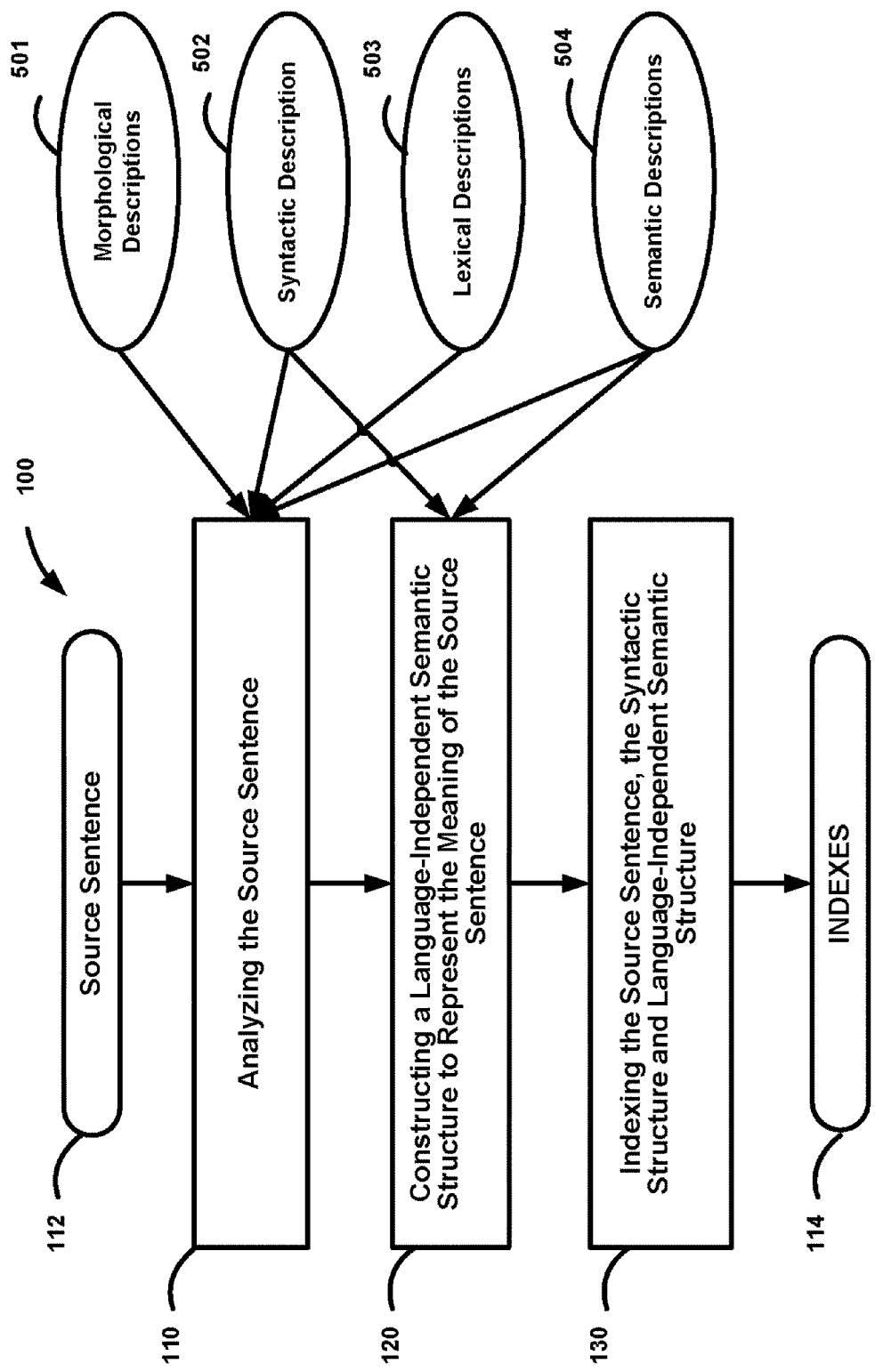
FIG. 1 illustrates a flow chart of a method 100 for preprocessing source sentences 112 in a source natural language prior to initiating a search.

In the following description, for purposes of explanation, numerous specific details are set forth in order to provide a thorough understanding of the invention. It will be apparent, however, to one skilled in the art that the invention can be practiced without these specific details.

Reference in this specification to "one embodiment" or "an implementation" means that a particular feature, structure, or characteristic described in connection with the embodiment is included in at least one implementation of the invention. The appearances of the phrase "in one embodiment" or "in one implementation" in various places in the specification are not necessarily all referring to the same embodiment or implementation, nor are separate or alternative embodiments mutually exclusive of other embodiments. Moreover, various features are described which may be exhibited by some embodiments and not by others. Similarly, various requirements are described which may be requirements for some embodiments but not other embodiments.

Implementations of the present invention disclose indexing techniques and systems for indexing natural language texts. Sematic search techniques and systems are also disclosed.

Broadly, one indexing technique disclosed herein comprises performing a comprehensive or exhaustive syntactic and semantic analysis of natural language texts to build an index for each natural language text. Advantageously, all syntactic and semantic information about each sentence in the natural language texts generated pursuant to the syntactic and semantic analysis is saved. The saved information may include interim parsing results and lexical choices, including the results obtained when resolving ambiguities.

The index so produced may be used to allow semantic searching of the natural language text, as will be described later.

The existing search systems make it possible to use simple query languages to find documents that either contain or do not contain the words or word combinations specified by the user. However, the user cannot specify whether the search words should occur within one sentence or not. Also, the user cannot formulate a query for a set of words that belong to a certain class. And finally, the existing search systems do not allow users to find sentences based on their syntactic or semantic properties, e.g. examples illustrating a certain syntactic relationship, examples illustrating a semantic relationship, or searches based on grammatical meanings, deep or surface slots, syntactic models, style and/or semantic features, etc. These types of searches may be of use to lexicographers, philologists, linguists, and students and teachers of native or foreign languages, and many other users.

Advantageously, the problems associated with existing search systems are overcome or at least reduced by the techniques and systems disclosed herein.

Further, implementations of the invention allows a user to search and to find relevant information using a semantic query that can be expressed in specific semantic query language, and also in a natural language. The same analyzer analyzes the question to recognize its syntactical structure, to build its semantic structure, and in such a way "understands" the meaning of the query. Searching is implemented in accordance with syntax and semantic of information which is included in searchable resources. So, a user can get only relevant output.

Additionally, since the search query may be expressed or translated into semantic language-independent terms, the search may be executed in various languages, in resources of various languages, in text corpora of various languages. Thus, a user can get information that is presented in all resources regardless of the language of the query. The result of searching may be presented to users in a resource language (as it is presented in the resource), and also the result of searching may be translated into the language of the query by means of a machine translation system.

Co-pending application U.S. Ser. No. 11/548214 discloses syntactic and semantic analysis methods (hereinafter "the analysis methods"). The analysis methods may be used to perform the analysis step of the disclosed indexing techniques. The analysis methods use a large number of exhaustive linguistic descriptions of a given natural language to reflect all the real complexities of the natural language, rather than simplified or artificial descriptions, without the danger of a combinatorial explosion, an unmanageable exponential complexity. Moreover, the analysis methods are based on a principle of integral and purpose-driven recognition, i.e. hypotheses about the structure of a part of a sentence are verified based on hypotheses about the structure of the whole sentence. This obviates the need to analyze numerous parsing anomalies or variants.

The analysis methods are now described, in accordance with one exemplary implementation. Referring to FIG. 1, there is shown a method 100 for preprocessing source sentences 112 in a source natural language prior to search. At step 110, the source sentences are analyzed using linguistic descriptions useful for analyzing the source sentence. The linguistic descriptions may include morphological descriptions, syntactic descriptions, lexical descriptions, and semantic descriptions. In one implementation, a plurality of linguistic models and knowledge about natural languages may be arranged in a database and applied for analyzing each source sentence. Such a plurality of models could include a morphology model, a syntax model a grammar model and a lexical-semantic model. In a particular implementation, integral models for describing the syntax and semantics of the source language are used in order to recognize the meanings of the source sentence, analyze complex language structures, and correctly convey information encoded in the source sentence.

When analyzing the meaning of the source sentence, a two-step analysis algorithm (e.g., rough syntactic analysis and precise syntactic analysis) may be implemented to make use of linguistic models and knowledge at various levels, to calculate probability ratings and to generate the most probable syntactic structure, e.g., a best syntactic structure.

Figure 2:
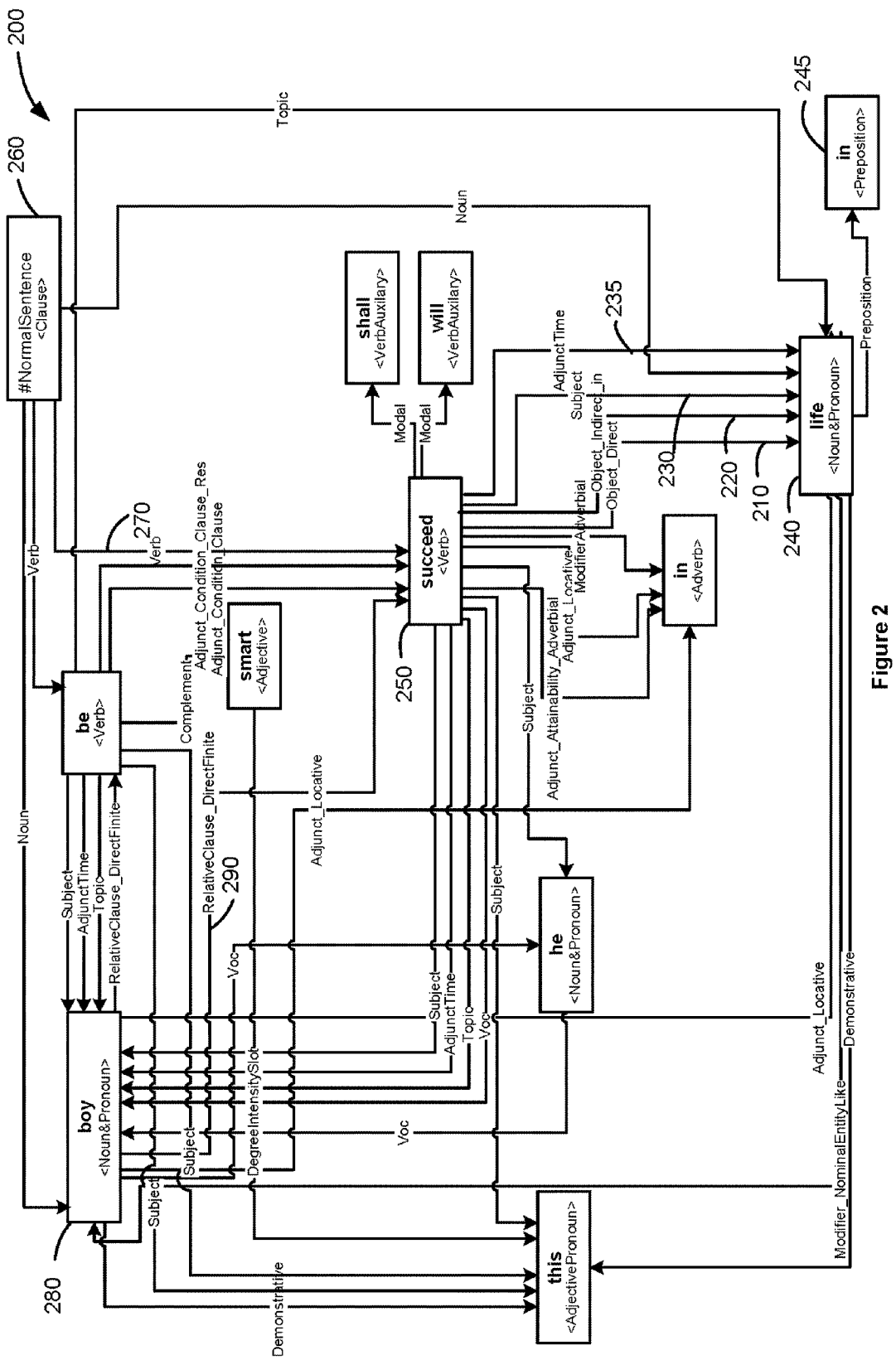
FIG. 2 illustrates an example of a graph of generalized constituents obtained as a result of a rough syntactic analysis of the sentence "This boy is smart, he'll succeed in life."

Accordingly, a rough syntactic analysis is performed on the source sentence to generate a graph of generalized constituents for further syntactic analysis. All the possible surface syntactic models for each element of lexical-morphological structure are applied, and all the possible constituents are built and generalized to represent all the possible variants of parsing the sentence syntactically. FIG. 2 illustrates an example of a graph of generalized constituents obtained as a result of rough syntactic analysis of the sentence "This boy is smart, he'll succeed in life."

Figure 3:
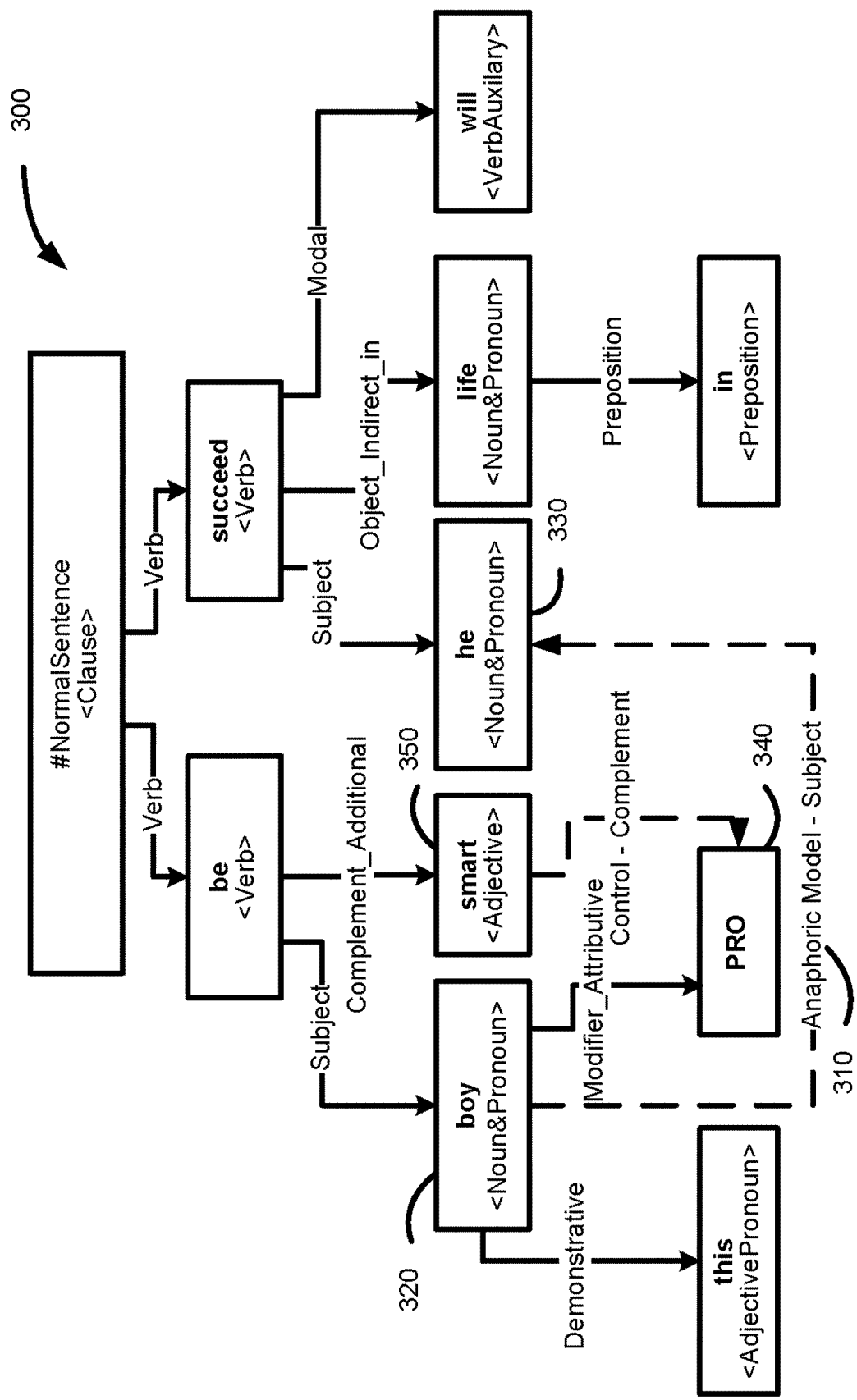
FIG. 3 shows an example of a syntactic tree, obtained as a result of a precise syntactic analysis of the sentence "This boy is smart, he'll succeed in life."

Following the rough syntactic analysis, a precise syntactic analysis is performed on the graph of generalized constituents to generate one or more syntactic trees to represent the source sentence. In one implementation, generating the syntactic tree comprises choosing between lexical options and choosing between relations from the graphs. Many prior and statistical ratings may be used during the process of choosing between lexical options, and in choosing between relations from the graph. The prior and statistical ratings may also be used for assessment of parts of the generated tree and for the whole tree. In one implementation, the one or more syntactic trees may be generated in order of decreasing assessment. Thus, the best syntactic tree may be generated first. Non-tree links are also checked and generated for each syntactic tree at this time. If the first generated syntactic tree fails, for example, because of impossibility to establish non-tree links, the second syntactic tree is taken as the best, etc. FIG. 3 shows an example of a syntactic tree 300, obtained as a result of precise syntactic analysis of the sentence "This boy is smart, he'll succeed in life." This tree contains complete syntactic information, such as lexical meanings, parts of speech, syntactic roles, grammatical values, syntactic relations (slots), syntactic models, non-tree link types, etc.

This novel two-step syntactic analysis approach ensures that the meaning of the source sentence is accurately represented by the best syntactic structure chosen from the one or more syntactic trees. Advantageously, the two-step analysis approach follows a principle of integral and purpose-driven recognition, i.e., hypotheses about the structure of a part of a sentence are verified using all available linguistic descriptions within the hypotheses about the structure of the whole sentence. This approach avoids a need to analyze numerous parsing anomalies or variants known to be invalid.

With reference to FIG. 1, at step 120, after the source sentence is analyzed, the syntactic structure of the sentence is semantically interpreted, and a language-independent semantic structure is constructed to represent the meaning of the source sentence. The language-independent semantic structure is a generalized data structure in language-independent form or format. Such a novel language-independent semantic structure is generated for each source sentence to accurately describe the meaning of the source sentence. The novel language-independent semantic structure can be applied to various applications, including, but not limited to, automated abstracting, machine translation, control systems, information retrieval or search, etc.

Figure 4:
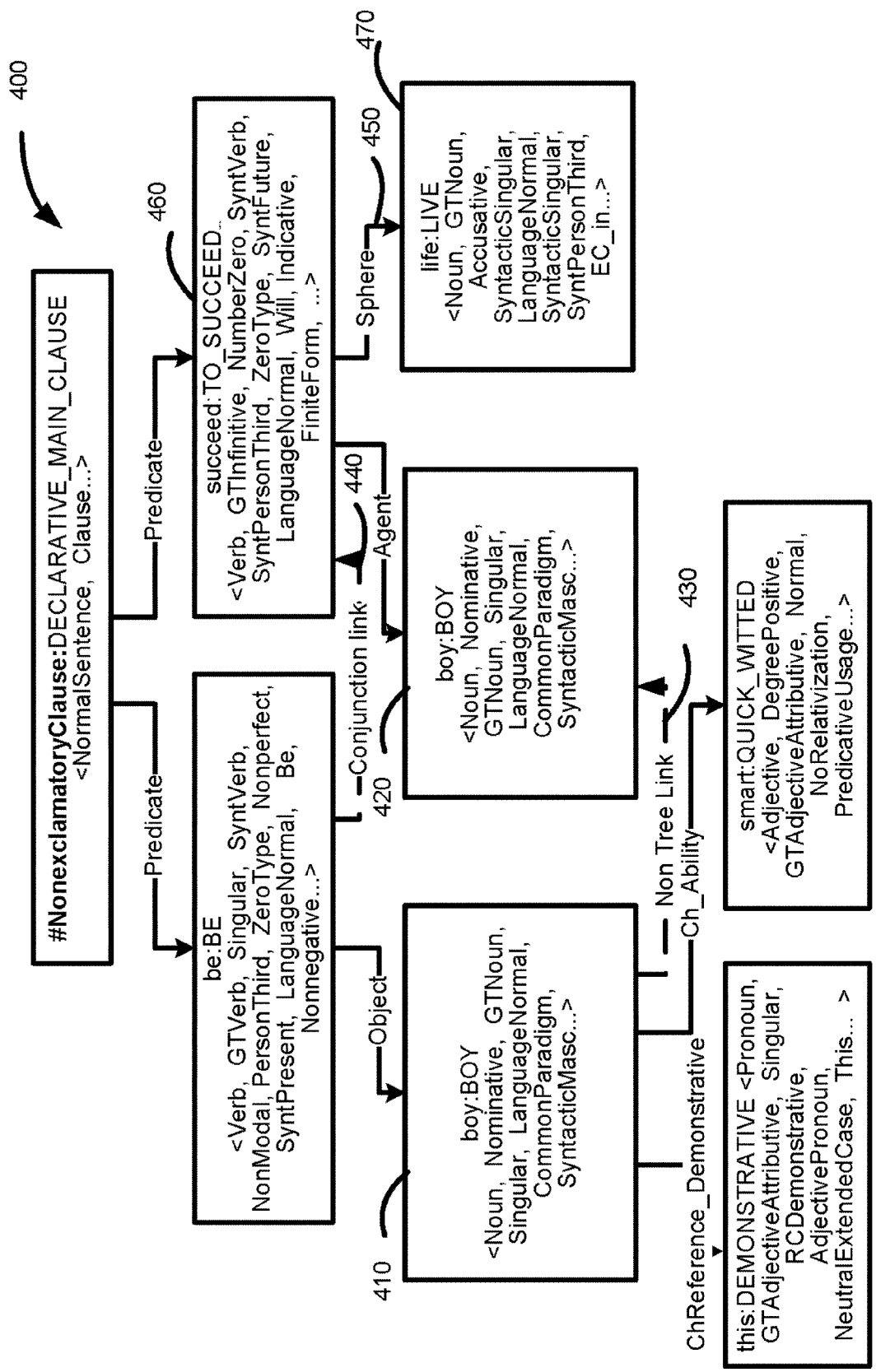
FIG. 4 shows an example of a semantic structure obtained for the sentence "This boy is smart, he'll succeed in life."

The disclosed analysis methods ensure that the maximum accuracy in conveying or understanding the meanings of the source sentence is achieved. FIG. 4 shows an example of a semantic structure, obtained for the sentence "This boy is smart, he'll succeed in life." This structure contains all syntactic and semantic information, such as semantic class, semantemes, semantic relations (deep slots), etc.

Figure 5:
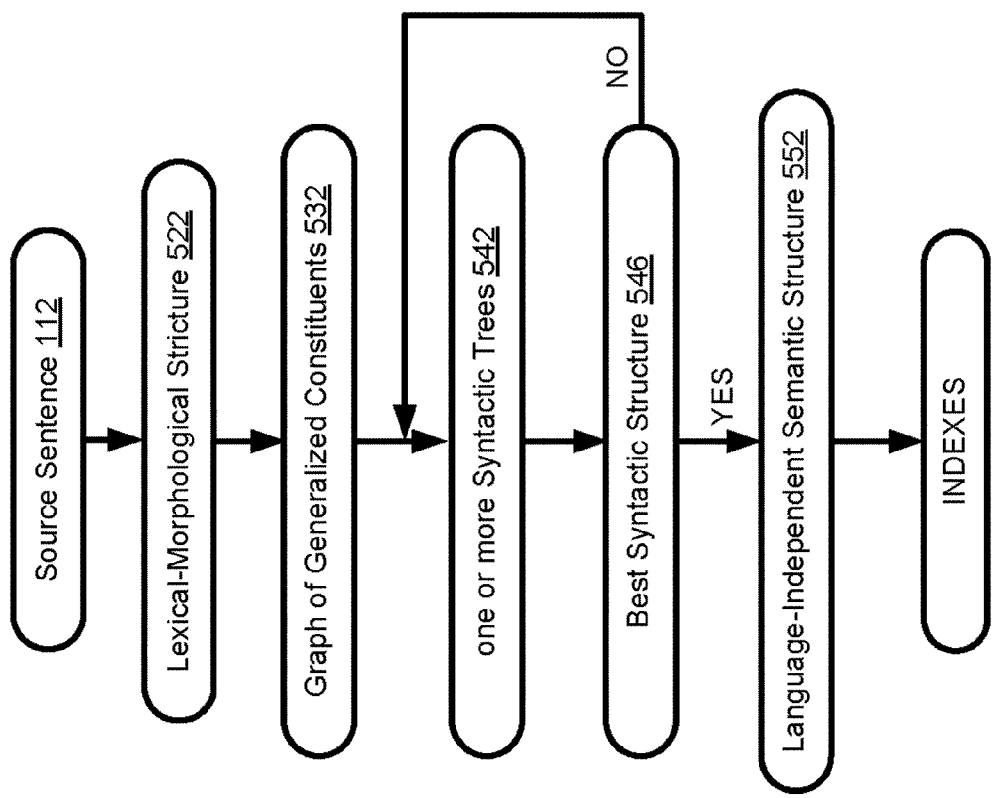
FIG. 5 illustrates converting a source sentence into a language independent semantic structure through various structures according to an exemplary implementation of the invention and the linguistic descriptions employed.

FIG. 5 illustrates a method to convert a source sentence into a language independent semantic structure through various structures according to an exemplary implementation of the invention and the linguistic descriptions employed. A lexical-morphological structure 522 is created from a source sentence (each source sentence in a corpus). A graph of generalized constituents is created 532. Next, one or more syntactic trees is created 542. A best syntactic structure is selected 546. If a best one is not found, the method iterates until a best syntactic structure is identified (or until the system and method are exhausted of possibilities). Once a best syntactic structure is identified and selected, a language-independent semantic structure is created 552. Indices are then generated.

Figure 6:
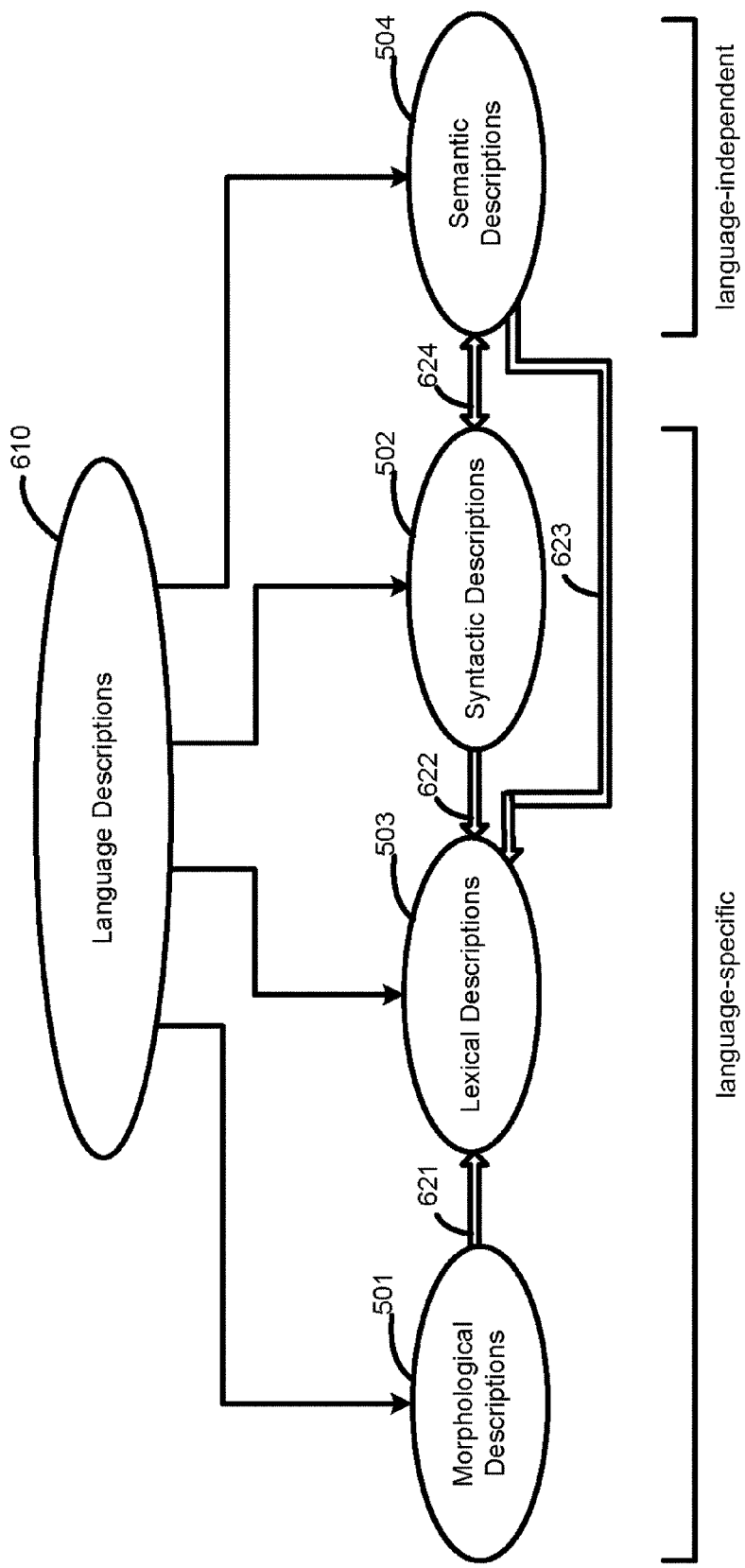
FIG. 6 is a diagram illustrating linguistic descriptions according to one exemplary implementation of the invention.

FIG. 6 is a diagram illustrating language descriptions 610 according to one exemplary implementation of the technology. With reference to FIG. 6, language descriptions 610 comprise morphological descriptions 501, syntactic descriptions 502, lexical descriptions, 503 and semantic descriptions 504. Language descriptions 610 are joined into one common concept. The core of the language descriptions 610 is a semantic hierarchy, which links together language-independent semantic descriptions 504 and language-specific (1) lexical descriptions 503, (2) morphological descriptions 501, and (3) syntactic descriptions 502 for each language.

Semantic hierarchy may include semantic notions or semantic entities referred to herein as "semantic classes". The semantic classes may be arranged into a sematic hierarchy comprising hierarchical parent-child relationships. In general, a child semantic class inherits most properties of its direct parent and all ancestral semantic classes. For example, semantic class SUBSTANCE is a child of semantic class ENTITY and at the same time it is a parent of semantic classes GAS, LIQUID, METAL, WOOD_MATERIAL, etc.

Each semantic class in the semantic hierarchy is supplied with a deep model. The deep model of the semantic class is a set of the deep slots. Deep slots reflect the semantic roles of child constituents in various sentences with objects of the semantic class as the core of a parent constituent and the possible semantic classes as fillers of deep slots. The deep slots express semantic relationships between constituents, including, for example, "agent", "addressee", "instrument", "quantity", etc. A child semantic class inherits and adjusts the deep model of its direct parent semantic class.

Semantic descriptions 504 are language-independent. Semantic descriptions 504 may provide descriptions of deep constituents, and may comprise a semantic hierarchy, deep slots descriptions, a system of semantemes, and pragmatic descriptions.

Figure 9:
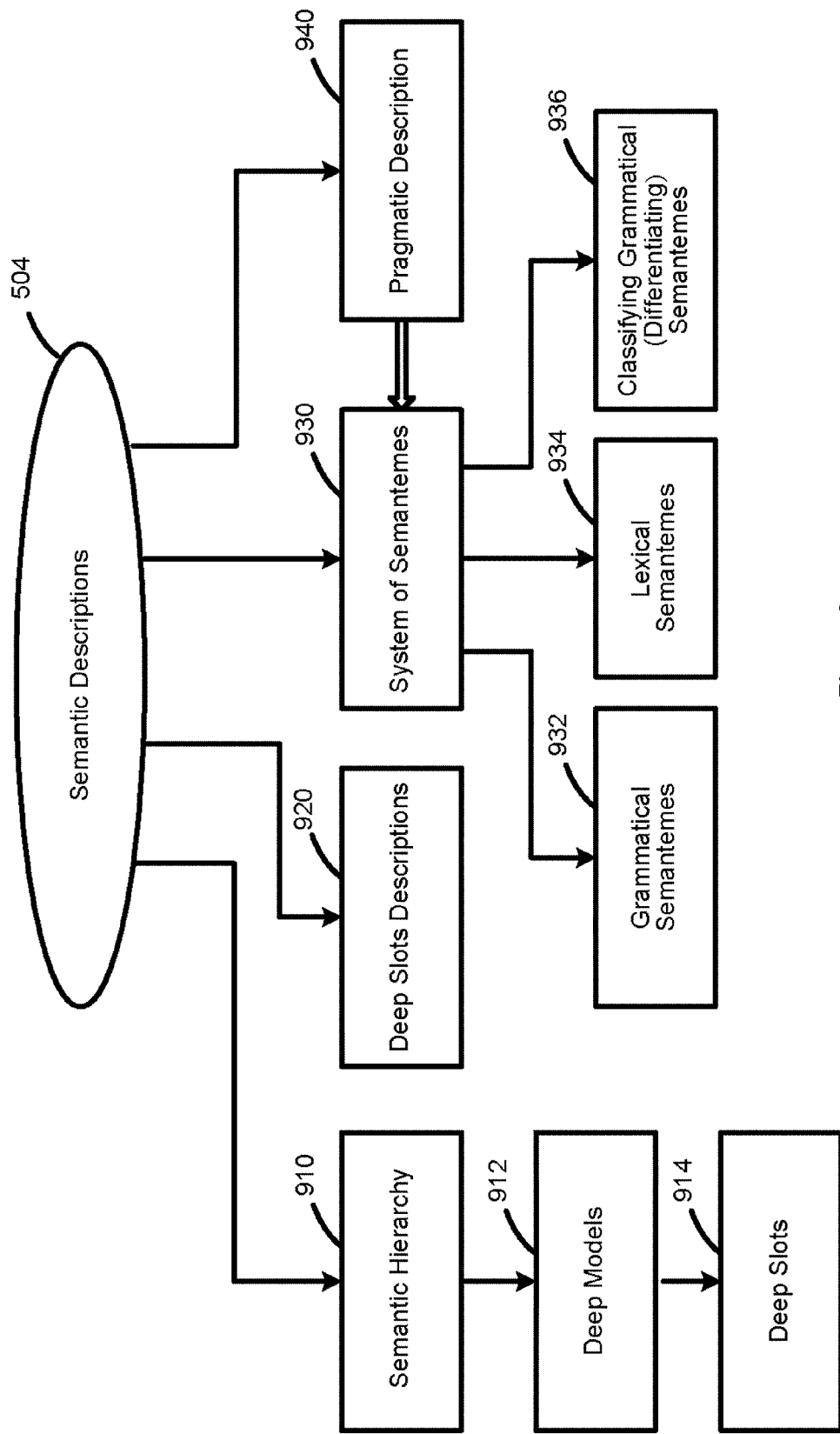
FIG. 9 is a diagram illustrating semantic descriptions according to one exemplary implementation of the invention.

FIG. 9 is a diagram illustrating semantic descriptions according to one exemplary implementation of the technology. Deep slots 914 reflect the semantic roles of child constituents in the deep models 912. The deep slots descriptions 920 also contain grammatical and semantic restrictions on possible fillers of the deep slots. The properties and restrictions for the deep slots 914 and their possible fillers are very similar and oftentimes identical among different languages.

A system of semantemes represents a set of semantic categories. As an example, a semantic category "DegreeOfComparison" can be used to describe the degrees of comparison expressed by various forms of adjectives, for example, "easy", "easier" and "easiest". So, the semantic category "DegreeOfComparison" may include such semantemes as, for example, "Positive", "ComparativeHigherDegree", "SuperlativeHighestDegree", among others. As another example, a semantic category "RelationToReferencePoint" can be used to describe an order as before or after a reference point relative to some event or object, etc., and its semantemes may include, "Previous", "Subsequent", and the order may be spatial or temporal in a broad sense. As yet another example, "EvaluationObjective", as a semantic category, may describe an objective assessment, such as "Bad", "Good", etc.

The systems of semantemes include language-independent semantic attributes that express semantic characteristics as well as stylistic, pragmatic and communicative characteristics. Semantemes can also be used to express an atomic meaning that finds a regular grammatical and/or lexical expression in a language. By purpose and usage, semantemes may be divided into various kinds, including, but not limited to, grammatical semantemes, lexical semantemes, and classifying grammatical (differentiating) semantemes.

Grammatical semantemes 932 are used to describe grammatical properties of constituents when transforming a syntactic tree (a language dependent object) into a semantic structure. Lexical semantemes 934 describe specific properties of objects (for example, "being flat" or "being liquid") and are used in the deep slot descriptions 920 as restriction for deep slot fillers (for example, for the verbs "face (with)" and "flood", respectively). Classifying grammatical (differentiating) semantemes 936 express differentiating properties of objects within a single semantic class. For example, in the semantic class "HAIRDRESSER" the semanteme <<RelatedToMen>> is assigned to the lexical meaning "barber", unlike other lexical meanings which also belong to this class, such as "hairdresser", "hairstylist", etc.

Pragmatic descriptions 940 are used to assign a corresponding theme, style or genre to texts and objects of the semantic hierarchy. For example, "Economic Policy", "Foreign Policy", "Justice", "Legislation", "Trade", "Finance", etc.

With reference to FIG. 5, the morphological descriptions 501, the lexical descriptions 503, the syntactic descriptions 502, and the semantic descriptions 504 may be related. A lexical meaning may have one or more surface (syntactic) models that may be provided by semantemes and pragmatic characteristics. The syntactic descriptions 502 and the semantic descriptions 504 are also related. For examples, diatheses of the syntactic descriptions 502 can be considered as the "interface" between the language-specific surface models and language-independent deep models of the semantic description 504.

Figure 7:
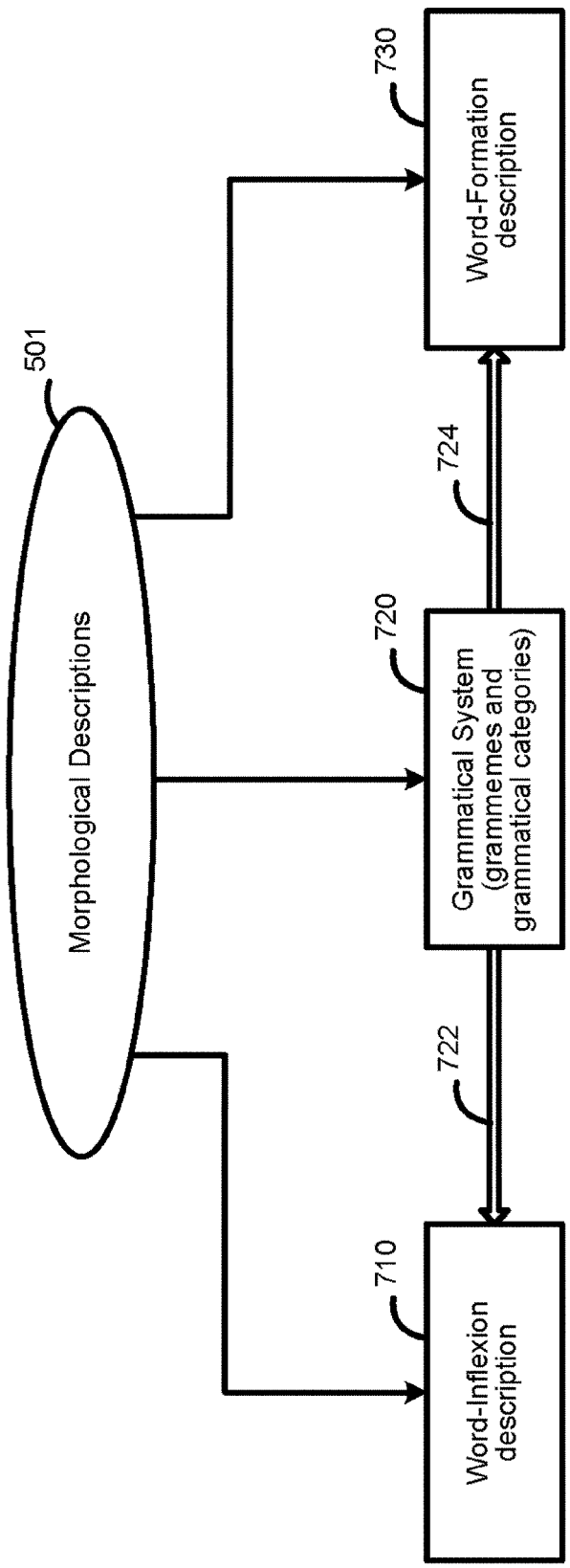
FIG. 7 illustrates exemplary morphological descriptions.

FIG. 7 illustrates exemplary morphological descriptions 501. As shown, the components of the morphological descriptions 501 include, but are not limited to, word-inflexion description 710, grammatical system (e.g., grammemes) 720, and word-formation description 730. In one embodiment, grammatical system 720 includes a set of grammatical categories, such as, "Part of speech", "Case", "Gender", "Number", "Person", "Reflexivity", "Tense", "Aspect", etc. and their meanings, hereafter referred to as "grammemes". For example, part of speech grammemes may include "Adjective", "Noun", "Verb", etc.; case grammemes may include "Nominative", "Accusative", "Genitive", etc.; and gender grammemes may include "Feminine", "Masculine", "Neuter", etc.

Word-inflexion description 710 describes how the main form of a word form may change according to its case, gender, number, tense, etc. and broadly includes all possible forms for a given word. Word-formation 730 describes which new words may be generated involving a given word. The grammemes are units of the grammatical systems 720 and, as shown by a link 722 and a link 724, the grammemes can be used to build the word-inflexion description 710 and the word-formation description 730.

Figure 8:
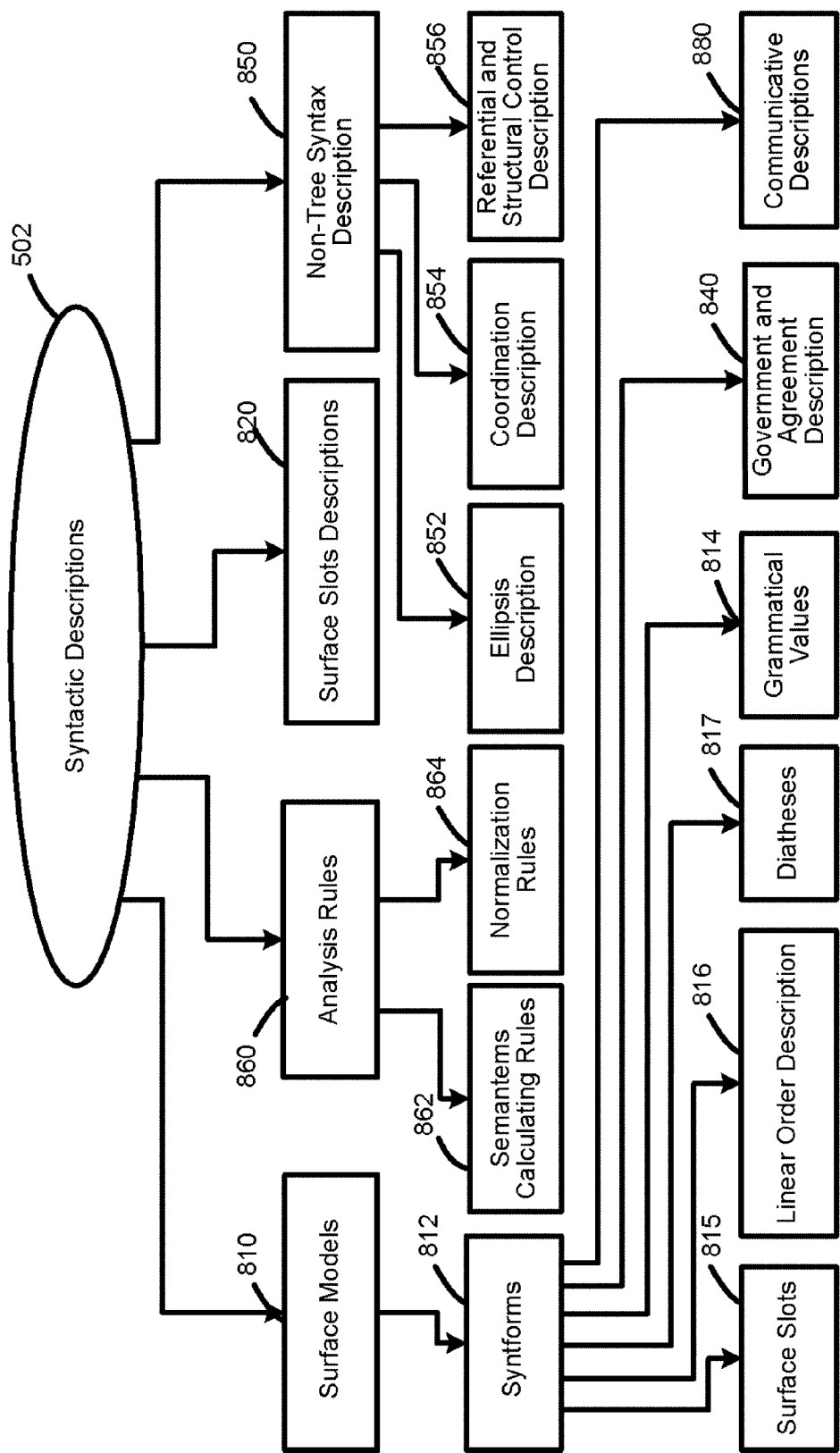
FIG. 8 illustrates exemplary syntactic descriptions.

FIG. 8 illustrates exemplary syntactic descriptions 502. The components of the syntactic descriptions 502 may comprise surface models 810, surface slot descriptions 820, referential and structural control descriptions 856, government and agreement descriptions 840, non-tree syntax descriptions 850, and analysis rules 860. The syntactic descriptions 502 are used to construct possible syntactic structures of a source sentence from a given source language, taking into account free linear word order, non-tree syntactic phenomena (e.g., coordination, ellipsis, etc.), referential relationships, and other considerations.

Figure 10:
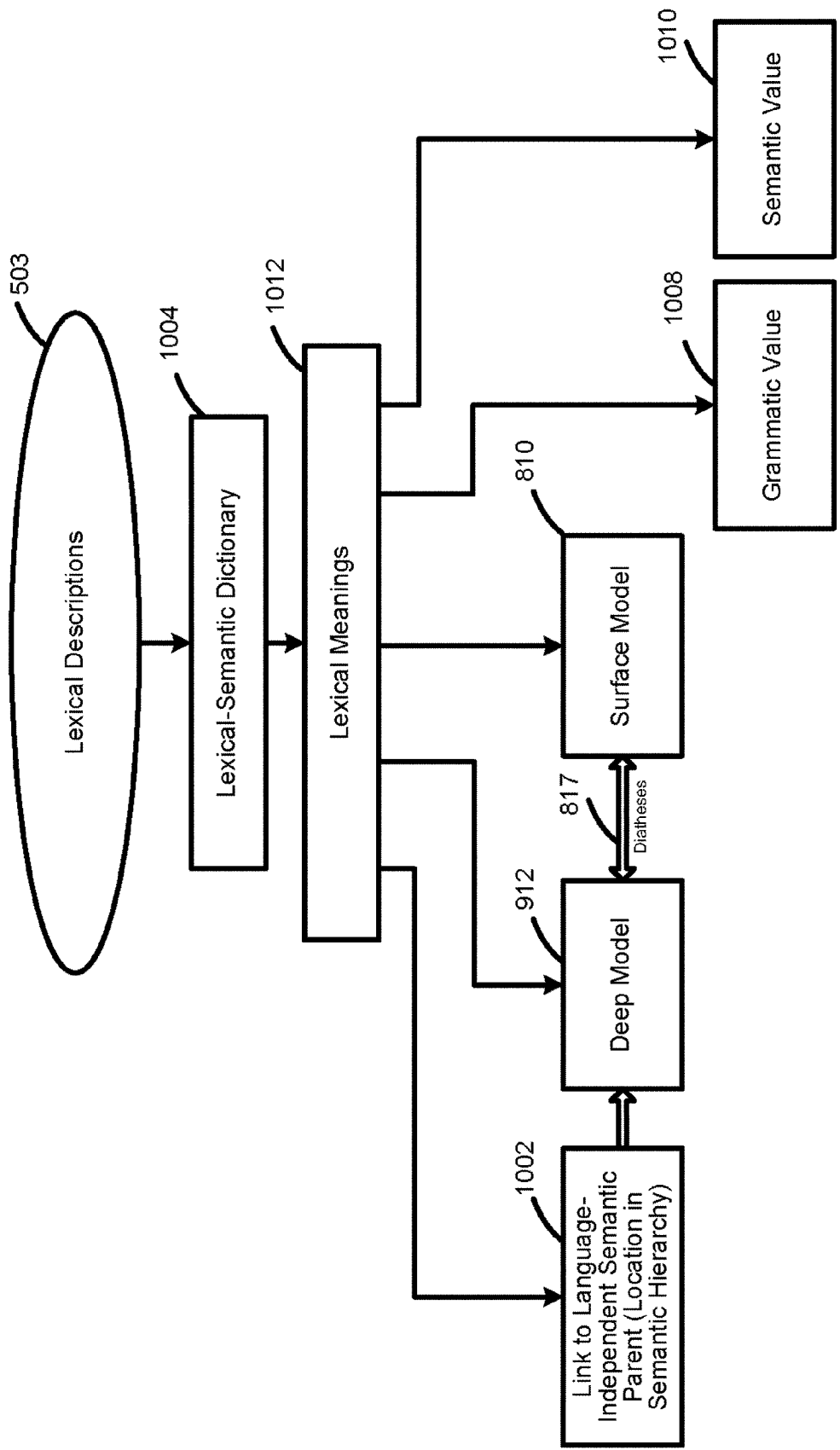
FIG. 10 is a diagram illustrating lexical descriptions according to one exemplary implementation of the invention.

FIG. 10 is a diagram illustrating lexical descriptions 503 according to one exemplary implementation of the technology. The lexical descriptions 503 include a Lexical-Semantic Dictionary 1004 that contains a set of lexical meanings 1012 arranged with their semantic classes into a Semantic hierarchy, where each lexical meaning 1012 may include, but is not limited to, its deep model 912, surface model 810, grammatical value 1008 and semantic value 1010.

Returning to FIG. 1, at step 130, after the language-independent semantic structure is constructed, then a syntactic structure and a language-independent semantic structure are indexed. Each parameter of the morphological, syntactic, lexical, and semantic descriptions can be indexed in the same fashion as each word in a document is indexed. An index usually comprises a table where each word (each lexeme or word form) in a document is accompanied by a list of numbers or addresses of its occurrences in that document. According to implementations described herein, an index is produced to index all values of morphological, syntactic, lexical, and semantic parameters. These parameters values are generated during the two-stage semantic analysis described above. The index may be used to facilitate semantic searching of the natural language source text. Thus, for example, a user may search for all sentences containing nouns with the property "being flat" or "being liquid", or all sentences containing nouns or verbs denoting processes of creating something, or destructing, or moving, etc.

Combinations of two, three, or, generally, combinations of n numbers can be used to index various syntactic, semantic or other parameters. For example, to index surface or deep slots, for each slot, combinations of two numbers of words that are linked by the relationship corresponding to these slots can be used. For example, referring to the example of FIG. 4 of a semantic structure obtained for the sentence "This boy is smart, he'll succeed in life", the deep slot 'Sphere' (450) relates the lexical meaning succeed:TO_SUCCEED (460) with the lexical meaning life:LIVE (470). More particularly, life :LIVE fills the deep slot 'Sphere' of the verb succeed: TO_SUCCEED. When the index of lexical meanings is built, in accordance with the techniques disclosed herein, these occurrences of the lexical meanings are assigned numbers based on the position of the occurrences within the document, for example, N1 and N2, respectively. When the index of deep slots is built, every deep slot has a corresponding list of occurrences in the document. For example, the index of the deep slot 'Sphere' will include the pair (N1, N2), among others.

Since not only words are indexed, but semantic classes, syntactic and semantic relations, any other elements of syntactic and semantic structures too, it becomes possible to search contexts including not only words, but also contexts including lexical meanings, semantic classes, contexts including words having the same syntactic features or/and semantic features or/and morphological features or a sets of such features. Additionally, sentences with non-tree syntax phenomena, for example, ellipsis, coordination etc. may be found. Since it possible to search semantic classes, sets of semantically associated words and notions may be found.

It is also possible to find fragments of syntactic and/or semantic structures. The results of searching may be sentences or paragraphs, or any other fragments as a user wants and selects the corresponding option. Since all sentences in each corpus are analyzed and saved with all results of their syntactic and semantic analyses, the syntactic and/or semantic structures of the found sentences may be graphically shown to a user.

Figure 11:
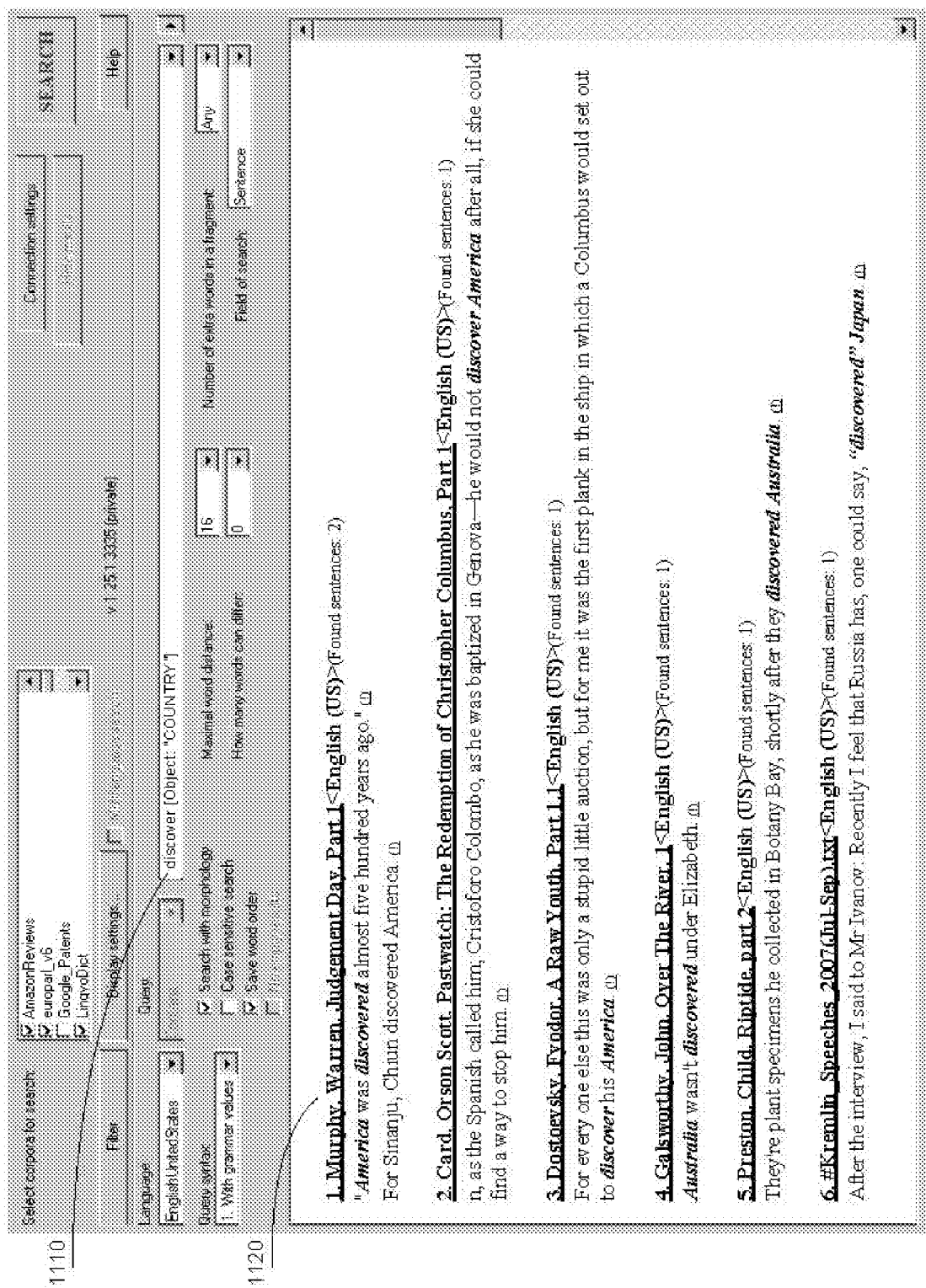
FIG. 11 shows an example of a search system interface that allows a user to formulate queries using semantic relations and semantic classes or lexical meanings that belong to a certain semantic class instead of conventional key words.

FIG. 11 shows an example of a search system graphical user interface that allows a user to formulate queries using semantic relations and lexical meanings that belong to a certain semantic class. An example of a query is shown in FIG. 11, and answers the question "What countries were discovered?" In terms of a semantic query in window 1110, the query appears as "discover [Object:"COUNTRY"]", and means that the semantic search system will search sentences with the verb "discover" and the object that belongs to the semantic class COUNTRY. Results of the search are shown in a search results window 1120.

Figure 12:
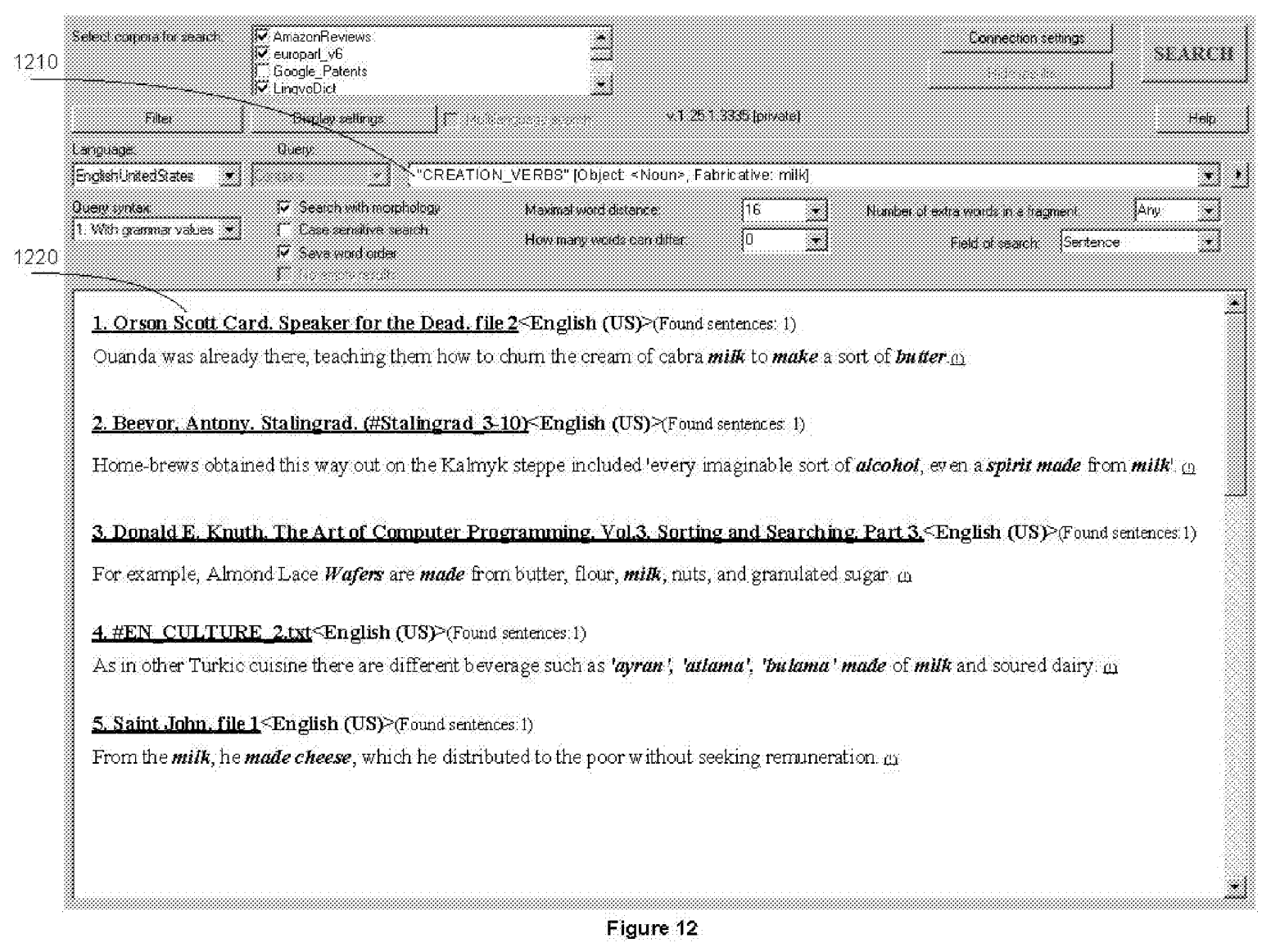

Another example of a query is shown in FIG. 12, it answers the question "What can be made from milk?" In terms of a semantic query, in window 1210 the query appears as "CREATION_VERBS" [Object:<Noun>, Fabricative: milk]", where "CREATION_VERBS" is a semantic class of verbs denoting process of creation, such as "to make", "to produce", "to manufacture", "to confect" etc. Any of these and other verbs belonging to the semantic class "CREATION_VERBS" may be found in required sentences. "Fabricative" is a semantic role (semantic slot) that means "raw material", material from which something us produced. In this case, such "raw material" is milk. So, the result must be a <Noun> and it must fill the semantic slot "Object" in sentences. Results of the search are shown in a search results window 1220.

Figure 13:
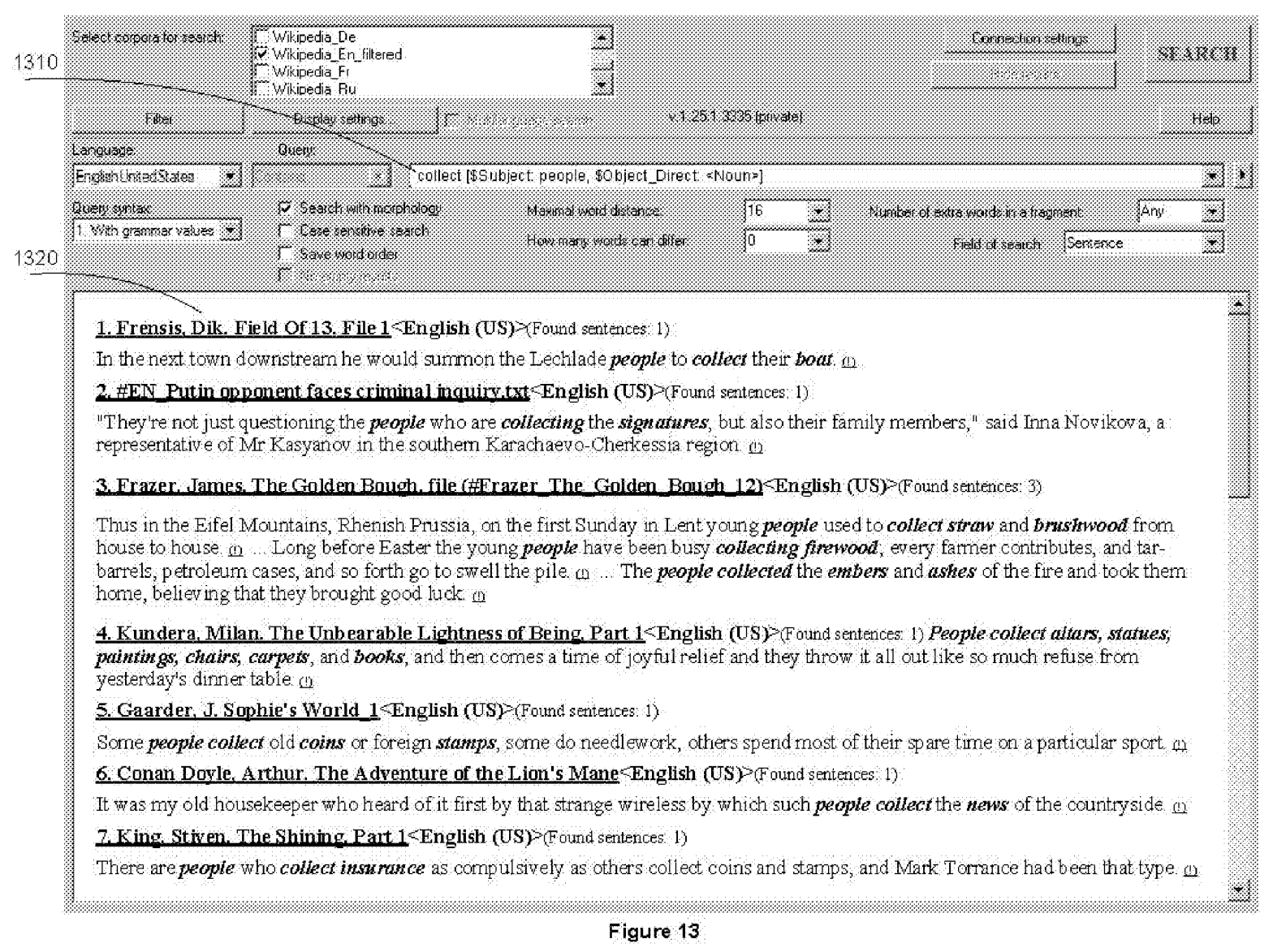

Yet another example of a query to the semantic search system is shown in FIG. 13. The question is: "What do the people collect?" In terms of a semantic query, in window 1310, the query appears as "collect[$Subject:people, $Object_Direct:<Noun>]". The semantic search system searches sentences with the verb "collect" and the word "people" that fills the surface slot "Subject". The goal of the search is a noun (or nouns) in the role of the direct object of the verb "collect". Results of search are shown in a search results window 1320.

In one implementation of the invention, all morphological forms of words involved in queries are taken into account, and all morphological forms of words may be found. The restrictions on morphological forms of words involved in queries and searched morphological forms may be specified as a restriction on grammatical values and is shown in, for example, brackets < >. The index produced in accordance with the techniques described herein may be provisioned as part of a semantic search system.

Implementations of the present invention also disclose a semantic search technique wherein a user can formulate a question in a natural language. The same analysis techniques are then used to analyze the question, recognize its syntactical structure, and build its semantic structure, thereby "understanding" the meaning of the sentence. The constructed semantic structure is then translated into a query language for the semantic search system.

The method of the present invention allows the creation of indexes for syntactic and semantic structures such as trees. The trees (structures) that are searched, or searched for, are described in a query for searching in terms of one or more requested parameters. One or more of the parameters may be indefinite, or may be defined by means of variables, or may be defined as a range of meanings of these variables. In other words, a query for searching may be represented as a natural language sentence with "lacunas". The lacunas may be covered by or include separate words, word combinations, phrases, a group of words represented by a bound constituent (substructure), embedded clause, etc. As result of a request and search, the lacunas are populated by variants, ones taken from text corpora. When presented to a user, variants may be or can be sorted by frequency.

Figure 13A:
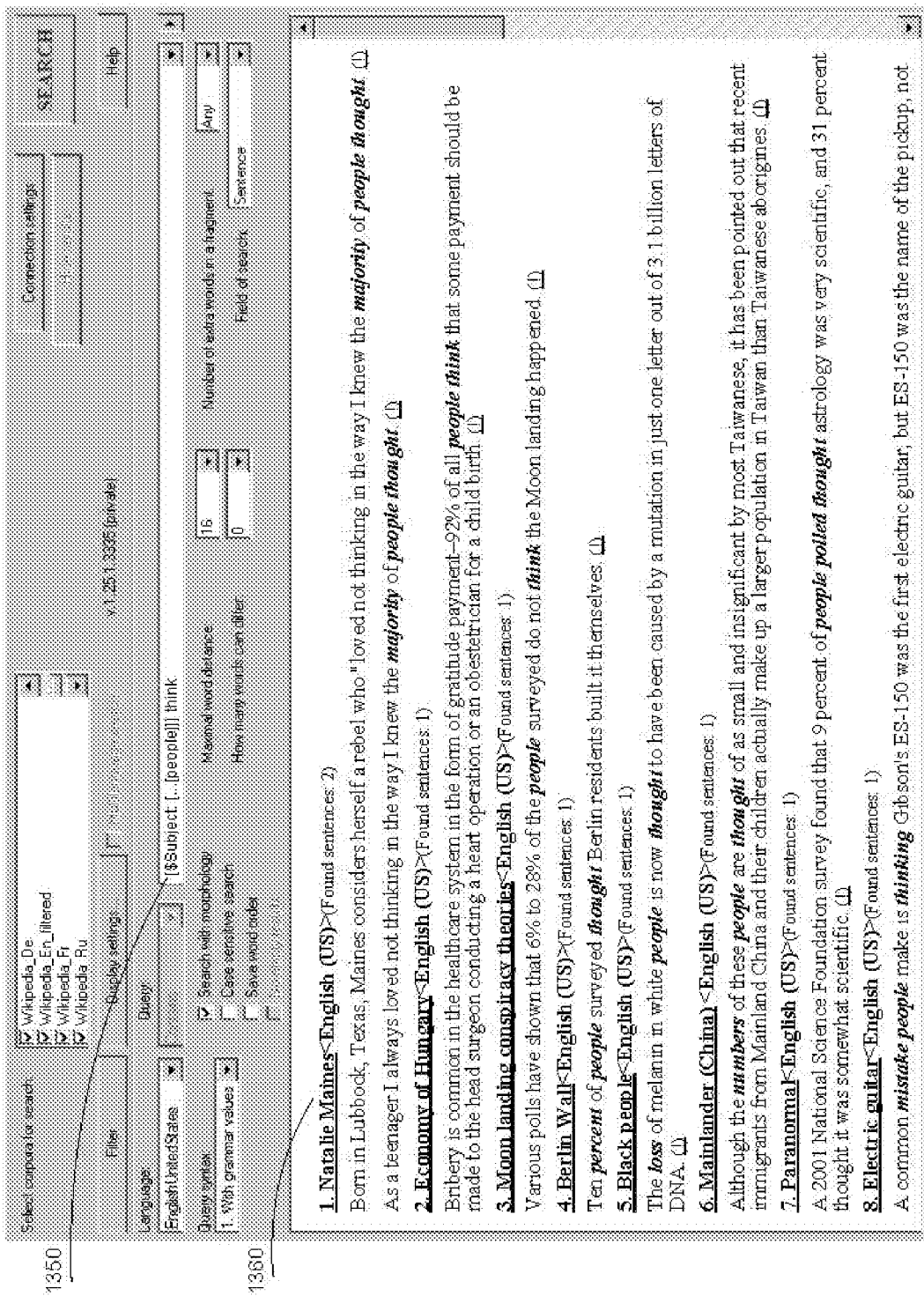
FIG. 13A shows still another example of query using variables for denoting "lacunas" and lexical meaning in searched sentences.

FIG. 13A shows still another example of a query using a variable for denoting "lacunas" in searchable sentences (or previously searched sentences). The query has the potential of handling one or more multi-language or multi-lingual corpora of texts. In such implementation, a variable, for example, [$Subject: [. . . [people]]] is used for describing searched sentences comprising noun group with the core "people" filling syntactic (surface) slot "Subject" and the verb "think" in any form.

The method enables a search of a wide list of entities such as relationships, non-tree links, lexical classes, semantic classes, etc. The entities (words or words combinations) may be found based on one or more grammatical properties, lexical properties, syntactical or semantic properties. Relations may be found by one or more syntactical properties. Clauses may be found by any (lexical, syntactical, semantic) property.

By the methods described herein, very specific types of searching may be performed. For example, it is possible to search properties of nodes of structures: grammatical values, class with all descendants (superclass), and semantemes (for example, "time" regardless of a form of its expression). Another possibility is searching for one or more properties of relationships. For example, it is possible to search surface or deep slots with (or without) checking a parent relationship, anaphoric relationship, or any quantity of nodes and relations with said properties. Further, it is possible to extract meanings of these properties found in search results.

Additionally, since the search query may be expressed or translated into semantic language-independent terms, the search may be executed in various languages, in resources of various languages, in text corpora of various languages. So, a user can get information that is presented in all resources regardless of the language of the query. The result of searching may be presented to users in a resource language (as it is presented in the resource), and also the result of searching may be translated into the language of the query by means of a machine translation system.

Figure 14:
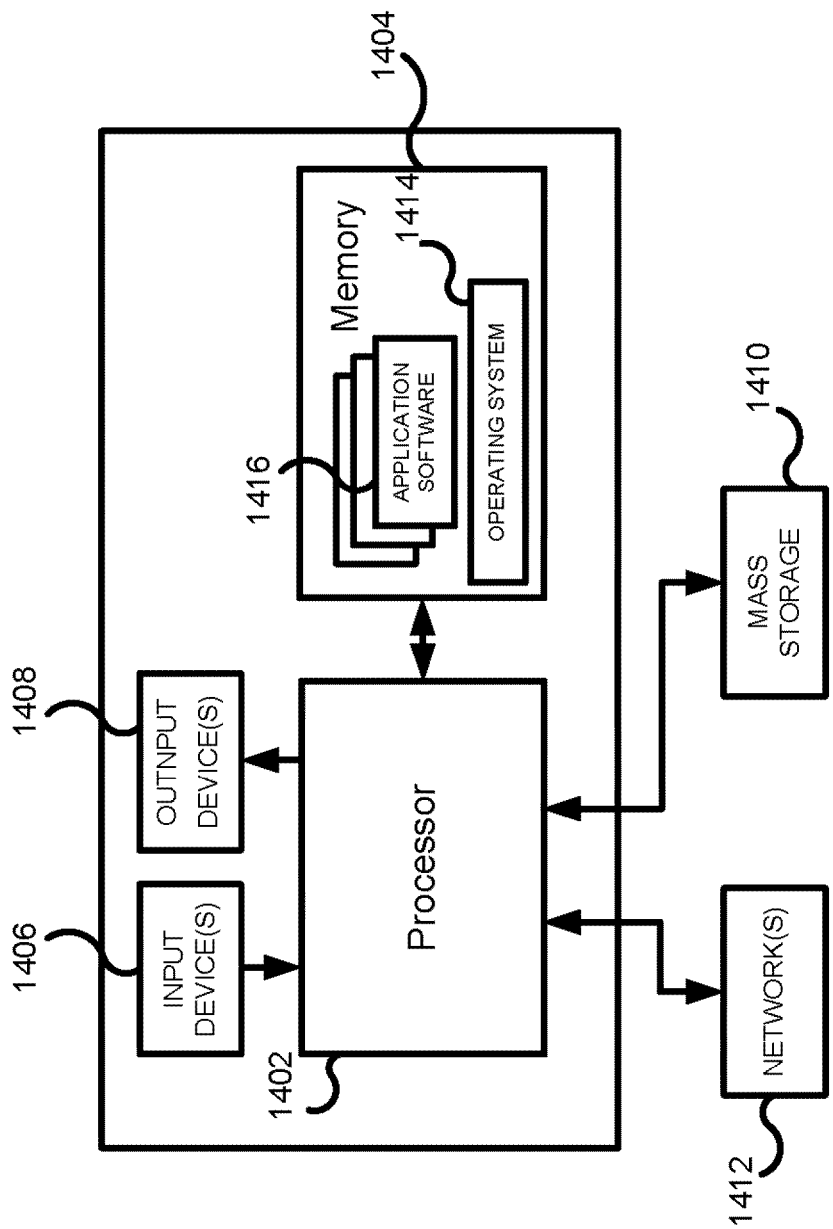
FIG. 14 shows exemplary hardware for implementing the searching system using the techniques described in this application, in accordance with an implementation of the present disclosure.

FIG. 14 shows exemplary hardware for implementing the techniques and systems described herein, in accordance with one implementation of the present disclosure. Referring to FIG. 14, the exemplary hardware 1400 includes at least one processor 1402 coupled to a memory 1404. The processor 1402 may represent one or more processors (e.g. microprocessors), and the memory 1404 may represent random access memory (RAM) devices comprising a main storage of the hardware 1400, as well as any supplemental levels of memory, e.g., cache memories, non-volatile or back-up memories (e.g. programmable or flash memories), read-only memories, etc. In addition, the memory 1404 may be considered to include memory storage physically located elsewhere in the hardware 1400, e.g. any cache memory in the processor 1402 as well as any storage capacity used as a virtual memory, e.g., as stored on a mass storage device 1410.

The hardware 1400 also typically receives a number of inputs and outputs for communicating information externally. For interface with a user or operator, the hardware 1400 may include one or more user input devices 1406 (e.g., a keyboard, a mouse, imaging device, scanner, microphone) and a one or more output devices 1408 (e.g., a Liquid Crystal Display (LCD) panel, a sound playback device (speaker)). To embody the present invention, the hardware 1400 typically includes at least one screen device.

For additional storage, the hardware 1400 may also include one or more mass storage devices 1410, e.g., a floppy or other removable disk drive, a hard disk drive, a Direct Access Storage Device (DASD), an optical drive (e.g. a Compact Disk (CD) drive, a Digital Versatile Disk (DVD) drive) and/or a tape drive, among others. Furthermore, the hardware 1400 may include an interface with one or more networks 1412 (e.g., a local area network (LAN), a wide area network (WAN), a wireless network, and/or the Internet among others) to permit the communication of information with other computers coupled to the networks. It should be appreciated that the hardware 1400 typically includes suitable analog and/or digital interfaces between the processor 1402 and each of the components 1404, 1406, 1408, and 1412 as is well known in the art.

The hardware 1400 operates under the control of an operating system 1414, and executes various computer software applications, components, programs, objects, modules, etc. to implement the techniques described above. Moreover, various applications, components, programs, objects, etc., collectively indicated by application software 1416 in FIG. 14, may also execute on one or more processors in another computer coupled to the hardware 1400 via a network 1412, e.g. in a distributed computing environment, whereby the processing required to implement the functions of a computer program may be allocated to multiple computers over a network.

In general, the routines executed to implement the embodiments of the invention may be implemented as part of an operating system or a specific application, component, program, object, module or sequence of instructions referred to as a "computer program." A computer program typically comprises one or more instruction sets at various times in various memory and storage devices in a computer, and that, when read and executed by one or more processors in a computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally to actually effect the distribution regardless of the particular type of computer-readable media used. Examples of computer-readable media include but are not limited to recordable type media such as volatile and non-volatile memory devices, floppy and other removable disks, hard disk drives, optical disks (e.g., Compact Disk Read-Only Memory (CD-ROMs), Digital Versatile Disks (DVDs), flash memory, etc.), among others. Another type of distribution may be implemented as Internet downloads.

While certain exemplary embodiments have been described and shown in the accompanying drawings, it is to be understood that such embodiments are merely illustrative and not restrictive of the broad invention and that this invention is not limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modified or re-arranged in one or more of its details as facilitated by enabling technological advancements without departing from the principals of the present disclosure.

The invention claimed is:

1. A computer-implemented method for facilitating a semantic search based on one or more previously analyzed and indexed corpuses of natural language texts, the method comprising:

identifying the one or more previously analyzed and indexed corpuses of natural language texts, each corpus including a plurality of sentences and indexes where indexes include indexes of meanings of linguistic parameters of the sentences and of their lexical units and their relations;

wherein the linguistic parameters comprise parameters determined based on syntactico-semantic analysis of at least one sentence in the corpuses; and the syntactico-semantic analysis of the at least one sentence comprises performing a rough syntactic analysis of the at least one sentence generating a graph of generalized constituents of the at least one sentence;

performing a precise syntactic analysis on the graph of generalized constituents by generating one or more syntactic trees and determining a syntactic structure of the at least one sentence, wherein the performing of the precise syntactic analysis comprises assessing parts of the one or more syntactic trees using prior and statistical ratings, and generating the one or more syntactic trees in an order of decreasing assessment;

semantically analyzing the syntactic structure of the sentence generating a language-independent semantic structure of the at least one sentence; and generating one or more of the parameters based on the language-independent semantic structure of the at least one sentence;

creating a query for searching sentences satisfying the query;

searching for sentences of the previously analyzed and indexed corpuses satisfying the query; and displaying the sentences satisfying the query.

2. The method of claim 1, wherein indexing each corpus of natural language texts comprises:

creating an index for each meaning of linguistic parameters of generated syntactic structures;

creating an index for each meaning of parameters of semantic structures;

storing each generated syntactic structure and the semantic structure for each sentence of the corpora of natural language texts; and storing each created index.

3. The method of claim 2, wherein indexing each corpus of natural language texts further comprises:

creating indexes of combinations of two or more meanings of linguistic parameters of generated syntactic structures;

creating indexes of combinations of two or more meanings of parameters of semantic structures; and storing each created index.

4. The method of claim 1, wherein the performing the syntactic analysis includes resolving an ambiguity of lexical unit meanings within at least one of the sentences of the corpora of text.

5. The computer-implemented method of claim 1, wherein the generating the language-independent semantic structure includes encoding the language-specific properties of the sentence and of its lexical units and their relations by means of language-independent parameters.

6. The method of claim 1, wherein the query for searching is expressed in a specific query language.

7. The method of claim 1, wherein the query for searching is expressed in a natural language.

8. The method of claim 7, wherein the query for searching is represented in a natural language sentence with lacunas, where said lacunas may be covered during searching, at least, with one or more separate words, one or more word combinations, a phrase, a group of words represented by a bound constituent (substructure), or one or more embedded clauses.

9. The method of claim 1, wherein the query for searching is expressed in terms of requested parameters, a part of which may be indefinite, or may be defined by means of one or more variables, or may be defined as a range of meanings of these variables.

10. The method of claim 9, wherein said requested parameters represent, at least one of the following: relationships, non-tree links, lexical classes, semantic classes, words or words combinations by grammatical properties, lexical properties, syntactical or semantic properties, relations by syntactical properties, or clauses by any (lexical, syntactical, semantic) properties.

11. The method of claim 9, wherein said requested parameters represent properties of relationships including surface or deep slots with or without checking a parent relationship, an anaphoric relationship or any quantity of nodes and relationships with said properties.

12. The method of claim 1, wherein the query for searching is expressed in a natural language with requested parameters, a part of which may be not defined, or may be defined by means of variables, or may be defined as a range of meanings of these variables.

13. The method of claim 12, wherein said requested parameters represent properties of searched nodes of syntactic or semantic structures, including grammatical values, classes with all descendants (superclasses), and semantemes.

14. The method of claim 1, wherein displaying the sentences satisfying the query includes sorting a query result by frequency.

15. One or more non-transitory computer-readable media having computer-executable instructions, which when executed perform steps, comprising:

identifying one or more previously analyzed and indexed corpuses of natural language texts, each corpus including a plurality of sentences and indexes where indexes include indexes of meanings of linguistic parameters of the sentences and of their lexical units and their relations;

wherein the linguistic parameters comprise semantic parameters determined based on syntactico-semantic analysis of at least one sentence in the corpuses; and the syntactico-semantic analysis of the at least one sentence comprises performing a rough syntactic analysis of the at least one sentence generating a graph of generalized constituents of the at least one sentence;

performing a precise syntactic analysis on the graph of generalized constituents by generating one or more syntactic trees and determining a syntactic structure of the at least one sentence, wherein the performing of the precise syntactic analysis comprises assessing parts of the one or more syntactic trees using prior and statistical ratings, and generating the one or more syntactic trees in an order of decreasing assessment;

semantically analyzing the syntactic structure of the sentence generating a language-independent semantic structure of the at least one sentence;

generating one or more of the parameters based on the language-independent semantic structure of the at least one sentence;

creating a query for searching sentences satisfying the query;

searching for sentences of the previously analyzed and indexed corpuses satisfying the query; and displaying the sentences satisfying the query.

16. The one or more non-transitory computer-readable media of claim 15, wherein indexing each corpus of natural language texts comprises:

creating an index for each meaning of linguistic parameters of generated syntactic structures;

creating an index for each meaning of parameters of semantic structures;

storing each generated syntactic structure and the semantic structure for each sentence of the corpora of natural language texts; and storing each created index.

17. The one or more non-transitory computer-readable media of claim 16, wherein indexing each corpus of natural language texts further comprises:

creating indexes of combinations of two or more meanings of linguistic parameters of generated syntactic structures;

creating indexes of combinations of two or more meanings of parameters of semantic structures; and storing each created index.

18. The one or more non-transitory computer-readable media of claim 15, wherein the performing the syntactic analysis includes resolving an ambiguity of lexical unit meanings within at least one of the sentences of the corpora of text.

19. The one or more non-transitory computer-readable media of claim 15, wherein the generating the language-independent semantic structure includes encoding the language-specific properties of the sentence and of its lexical units and their relations by means of language-independent parameters.

20. The one or more non-transitory computer-readable media of claim 15, wherein the query for searching is expressed in a specific query language.

21. The one or more non-transitory computer-readable media of claim 15, wherein the query for searching is expressed in a natural language.

22. The one or more non-transitory computer-readable media of claim 15, wherein the query for searching is expressed in terms of one or more requested parameters, one or more of which may be indefinite, or may be defined by means of one or more variables, or may be defined as a range of meanings of these variables.

23. The one or more non-transitory computer-readable media of claim 22, wherein said requested parameters represent, at least one of the following: a relationship, a non-tree link, a lexical class, a semantic class, one or more word or word combinations of grammatical properties, one or more word or word combinations of lexical properties, one or more word or word combinations of syntactical or semantic properties, one or more relationships represented by one or more syntactical properties, or clauses of a (lexical, syntactical, or semantic) property. parameters, one or more of which may be indefinite, or may be defined by means of one or more variables, or may be defined as a range of meanings of these variables.

24. The one or more non-transitory computer-readable media of claim 22, wherein said requested parameters represent properties of relationships including surface or deep slots with or without checking a parent relationship, an anaphoric relationship or any quantity of nodes and relationships with said properties.

25. The one or more non-transitory computer-readable media of claim 15, wherein the query for searching is expressed in a natural language with requested parameters, a part of which may be indefinite, or may be defined by means of variables, or may be defined as a range of meanings of these variables.

26. The one or more non-transitory computer-readable media of claim 25, wherein said requested parameters represent properties of searched nodes of syntactic or semantic structures, including grammatical values, classes with all descendant (superclass), semantemes (for example, "time" regardless of a form of its expression).

27. The one or more non-transitory computer-readable media of claim 15, wherein the query for searching is represented in a natural language sentence with one or more lacunas, where said lacunas may be covered during searching, at least, with one or more separate words, one or more word combinations, a phrase, a group of words represented by a bound constituent (substructure), or one or more embedded clauses.

28. The one or more non-transitory computer-readable media of claim 15, wherein displaying the sentences satisfying the query includes sorting a query result by frequency.

* * * * *